United States Patent
Andrews et al.

(10) Patent No.: US 7,703,082 B2
(45) Date of Patent: Apr. 20, 2010

(54) CONTROLLING USER INTERVENTION IN A MULTI-PROCESSING COMPUTER SYSTEM

(75) Inventors: Pauline Elizabeth Andrews, Southhampton (GB); Robert Harris, Christchurch (GB)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 11/005,822

(22) Filed: Dec. 7, 2004

(65) Prior Publication Data

US 2006/0123395 A1  Jun. 8, 2006

(51) Int. Cl.
*G06F 9/44* (2006.01)

(52) U.S. Cl. .................. 717/129; 717/130; 717/131

(58) Field of Classification Search .............. 717/110, 717/111, 113, 127–31, 128, 129; 711/119–145
See application file for complete search history.

(56) References Cited

U.S. PATENT DOCUMENTS

| | | | | |
|---|---|---|---|---|
| 4,912,628 A * | 3/1990 | Briggs | .................. | 718/100 |
| 5,446,900 A * | 8/1995 | Kimelman | .................. | 717/124 |
| 5,787,490 A * | 7/1998 | Ozawa | .................. | 711/173 |
| 6,131,185 A * | 10/2000 | Coskun et al. | .................. | 717/129 |
| 6,145,123 A * | 11/2000 | Torrey et al. | .................. | 717/128 |
| 6,286,132 B1 * | 9/2001 | Tanaka et al. | .................. | 717/125 |
| 6,353,896 B1 * | 3/2002 | Holzmann et al. | .................. | 714/38 |
| 6,470,422 B2 * | 10/2002 | Cai et al. | .................. | 711/129 |
| 6,587,937 B1 * | 7/2003 | Jensen et al. | .................. | 711/173 |
| 6,611,898 B1 * | 8/2003 | Slattery et al. | .................. | 711/118 |
| 6,631,451 B2 * | 10/2003 | Glance et al. | .................. | 711/158 |
| 6,948,165 B1 * | 9/2005 | Luu et al. | .................. | 717/172 |
| 6,983,454 B2 * | 1/2006 | Bates et al. | .................. | 717/129 |
| 7,017,151 B1 * | 3/2006 | Lopez et al. | .................. | 717/127 |
| 7,143,393 B1 * | 11/2006 | Ezra et al. | .................. | 717/127 |
| 7,191,319 B1 * | 3/2007 | Dwyer et al. | .................. | 712/228 |
| 7,191,441 B2 * | 3/2007 | Abbott et al. | .................. | 718/1 |
| 7,225,432 B2 * | 5/2007 | Jentsch et al. | .................. | 717/129 |
| 7,225,433 B2 * | 5/2007 | Jentsch et al. | .................. | 717/129 |
| 2001/0049770 A1 * | 12/2001 | Cai et al. | .................. | 711/129 |
| 2001/0051980 A1 | 12/2001 | Raciborski et al. | .................. | 709/203 |
| 2002/0099753 A1 * | 7/2002 | Hardin et al. | .................. | 709/1 |
| 2002/0184612 A1 | 12/2002 | Hunt et al. | .................. | 717/116 |
| 2004/0031019 A1 * | 2/2004 | Lamanna et al. | .................. | 717/125 |
| 2005/0222689 A1 * | 10/2005 | Smith et al. | .................. | 700/1 |

* cited by examiner

*Primary Examiner*—Wei Y Zhen
*Assistant Examiner*—Matthew J Brophy (57) ABSTRACT

A computer program implemented method controls interruption of execution of tasks running in a multi-processing computer system to permit user intervention. The system includes a repository of data identifying preselected tasks for interruption and identifying the user defined circumstances for such interruption. It also has a plurality of task caches for storing subsets of the repository data for respective tasks. According to the method, the repository is scanned during an initiation phase of any task for data relevant to the task. Any such relevant data is stored in the respective task cache. The task is then executed and if a defined circumstance for the task arises by reference to the task cache, the task is interrupted to enable user intervention. This can include updating the repository to redefine the circumstances for interruption. Execution is then resumed and the respective task cache refreshed with any relevant repository updates.

11 Claims, 7 Drawing Sheets

CONTROLLING USER INTERVENTION IN A MULTI-PROCESSING COMPUTER SYSTEM

FIELD OF THE INVENTION

This invention relates to a method and system for controlling user intervention in a multi-processing computer system and particularly to the use of caches in effecting such control.

BACKGROUND OF THE INVENTION

Frequently, in the development of computer programs, there is a need to halt execution of the program in order to allow user intervention. Commonly, this is useful when debugging the program for errors. It may also be useful for performance analysis, turning on of tracing applications or profiling.

One example of a program in connection with which such operations are used is CICS Transaction Server for z/OS™ (CICS TS), available from IBM Corporation ("CICS" and "z/OS" are trademarks or registered trademarks of International Business Machines Corporation), but techniques generally apply to all multi-processing environments, with special emphasis on distributed systems. A multi-processing environment is one in which multiple activities occur on behalf of many users. This environment is typically found in computers that act as Servers. CICS Transaction Server is one example of such a multi-processing environment which supports application programs, written by users of CICS, which typically include newly written or pre-supplied CICS transactions. The current discussion is concerned solely with the debugging of these user written application programs.

The term distributed refers to a collection of computers which are all linked together to form a distinct unit. In the case of CICS TS, multiple instances of CICS can run in multiple CICS TS regions executing within a mainframe running the z/OS operating system to form a distributed system. Several linked mainframe computers each running the IBM z/OS operating system can also participate in a distributed arrangement called a sysplex (also referred to in the case of CICS as a CICSPlex) in which the various components communicate through a coupling facility.

The term debugging means the act of stopping the execution of a computer program when a given set of circumstances occur, together with the investigation of the execution environment for that program when stopped.

The places where execution is halted are called breakpoints. Breakpoints can, for example, cause execution to stop:
- at a specific place in execution (for example: at instruction 45 in program XX);
- whenever a generic event occurs (for example: variable Y contains 57);
- whenever a specific event occurs (for example: program YY is executed).

When a breakpoint is reached, program execution is halted and the user has the opportunity to examine the execution environment (for example: by inspecting the current settings of variables) and change it (for example: by altering the contents of a variable) before permitting execution to continue. This is called amending the State of the program execution instance. Execution continues until another breakpoint is encountered or execution terminates. Whilst execution of the program is halted at a breakpoint, the plurality of breakpoints can be manipulated (for example: by adding a new breakpoint) which will alter the subsequent execution of the program (for example: by halting at additional locations).

When using debugging techniques in a multi-processing environment, the plurality of breakpoints applies not merely to a single user acting on a single program, but to all users running all programs. So, for example, any user can encounter a breakpoint which stops execution at, say, instruction 42 in program XX, because access to program XX is available to all users in the multi-processing environment. In turn, this means the plurality of breakpoints have to be available to all activities in the multi-processing environment. Consequently, the debugging information (which includes the breakpoint information) must be held in a repository which is shared and accessible to all activities within the multi-processing environment. This repository can be a simple file, an indexed file or a database: the crucial thing is that it is shared between all activities.

Breakpoints fall into several general types within the CICS TS environment:
- a breakpoint can be very specific: 'Stop at instruction 42 in program PROGA when executed by a transaction called PEOH for user RAH';
- alternatively, it can be generically specified: 'Stop at instruction 42 in program PROGA when executed by a transaction called PEO* for any user';
- or it can have wide applicability: 'Stop at instruction 42 in program PROGA when executed by any transaction for any user';
- a generic definition uses wildcards to specific items. PEO* means apply to any item whose $1^{st}$ three characters start with PEO and the $4^{th}$ (and last) character can be anything (as indicated by the *)

In the case of CICS TS, a separate program, known as the IBM Debug Tool, runs simultaneously when given CICS TS regions are in a "Debug On" state. The general interaction of this debugging tool with CICS TS is illustrated in FIG. 1.

Figure 1:
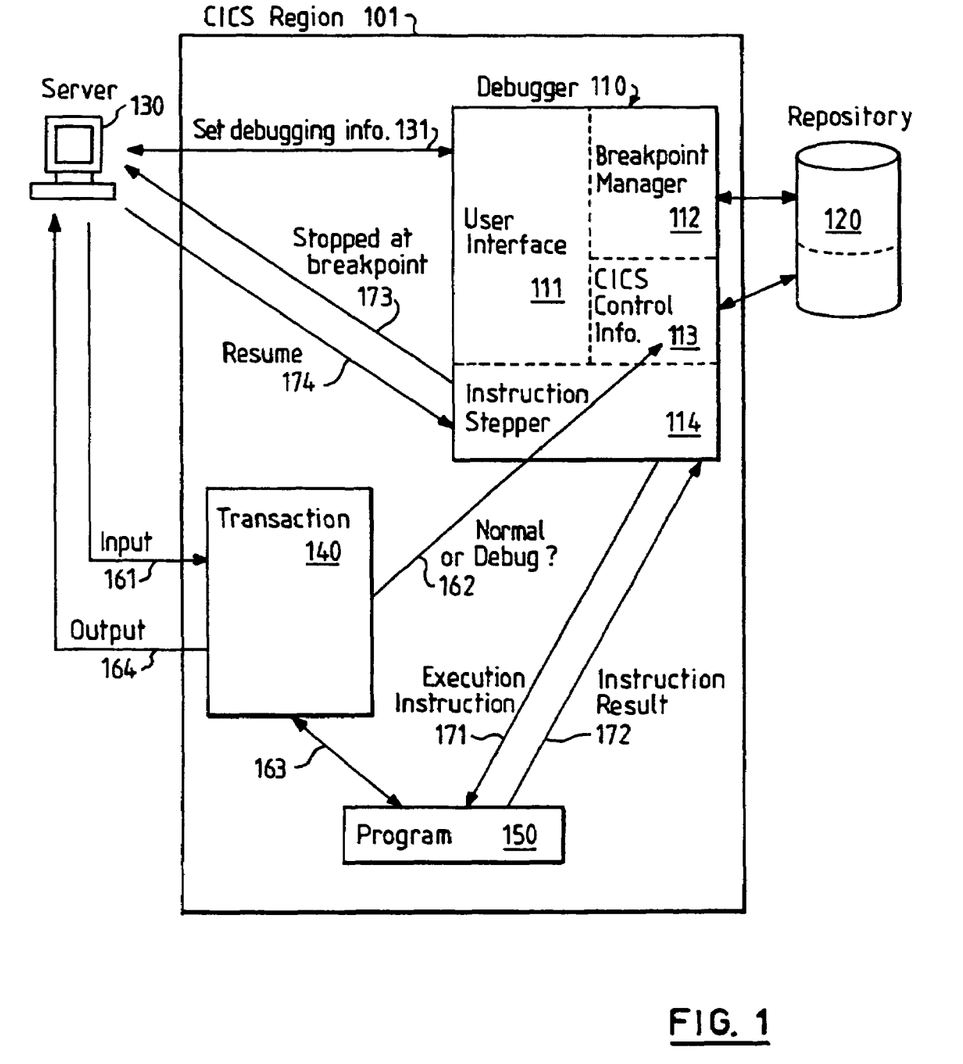
FIG. 1 is a schematic block diagram of a known system illustrating the logical interaction between a user, the user's program, a CICS region and a debugging tool.

With reference to FIG. 1 consider the relationship between the debugging tool (110) and the item undergoing analysis. In the illustrated environment of CICS TS, the item being debugged is a program (150) which is being executed under the ambit of a CICS transaction instance (140).

When the CICS transaction (140) is not being debugged:
- the user initiates the transaction (140) from a terminal (130);
- input (161) is sent to the program
- execution proceeds (163) into the relevant program (150) which executes its instructions;
- The results (164) are returned to the user (130).

However, when the CICS region (101) is enabled for debugging, the transaction (161) has an additional processing step (162) which determines whether or not the transaction instance itself (140) is to be debugged. If it is not, then the detection step (162) does not alter the aforementioned logical flow.

The debugging logic (110) consists of several logical (but not necessarily physical) components:
- an interface (111) with the user which controls the debugging activity;
- an instruction stepper (114) which physically executes a program being debugged;
- a breakpoint manager (112) which determines the breakpoints of interest to the instruction stepper (114);
- some control logic (113) for the environment—which in this preferred implementation is CICS TS.

Pieces of information relevant to the operation of the debugger (110) are held externally in a repository (120). This repository may be physically implemented in a number of sub-components, but these are logically managed in one group.

If the Transaction is to be debugged, the additional processing step (162) returns a result which alters the execution of the program (150). Instead of execution proceeding directly (163), each instruction of the program (150) is executed under the control of the debugging logic (110). In particular, each instruction of the program (150) is executed within the ambit of the debugger (110). Consequently, each 'real' instruction in the program (150) is physically preceded by an instruction execution logical flow (171) and the corresponding result (172) after the execution of that instruction. These flows (171,172) are associated with the debugging logic (110) and in particular with the instruction stepper sub-component (114).

In effect, the user does not send a single input (161) and receive a single output (164) when the transaction (140) is being debugged. Additional flows (173, 174) to the user are presented according to the debugging logic. In particular, (173) results from a breakpoint halting execution. In the time period which occurs between flows (173) and (174)) the user (130) can inspect the state of the executing transaction and generally modify (131) the breakpoint information. After these actions, the user will continue execution (174) of the program (150). These interactions continue until the end of the program (150) is reached.

This present invention is concerned with novel processing during the period between flows 173 and 174 The detailed functioning of the IBM Debug Tool plays no part in the invention but further details can be found in a publication "Introduction to the IBM Problem Determination Tools" (Ref SG246296) available from IBM Corporation.

Figure 2:
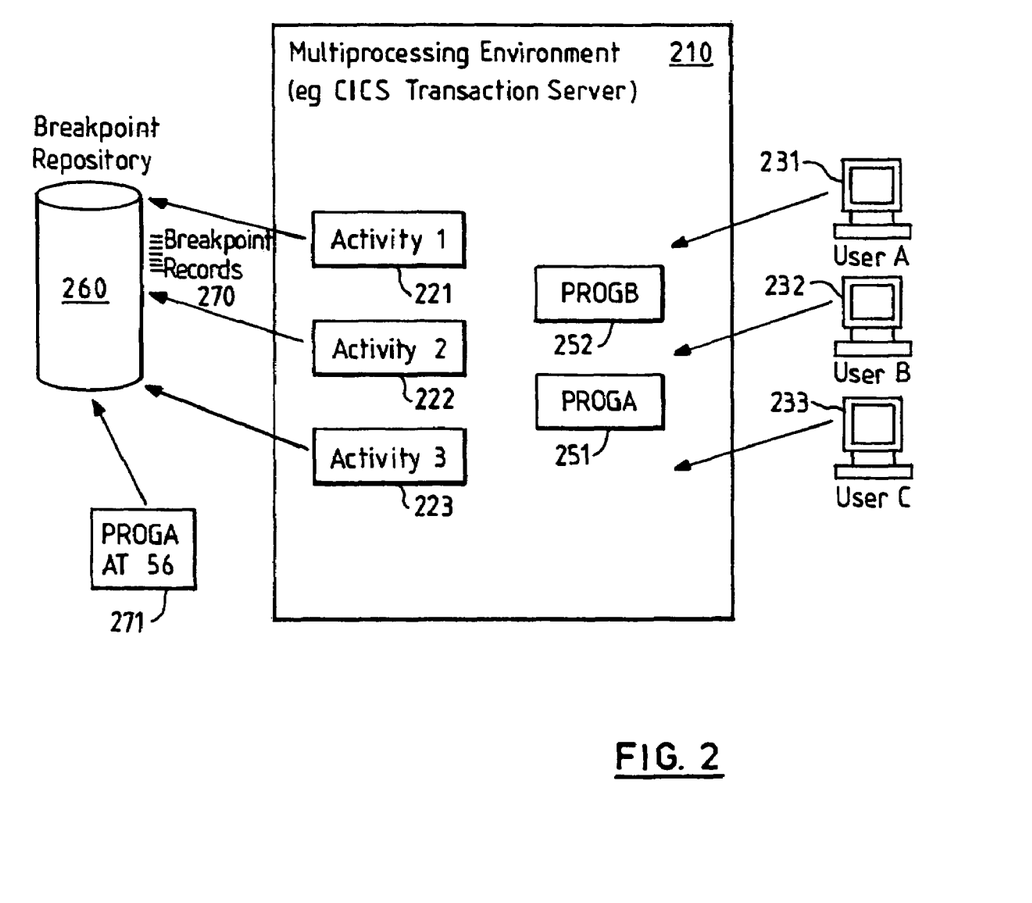
FIG. 2 is a diagrammatic illustration of the problem addressed by the present invention arising in connection with the storage of debugging breakpoints in a known multiprocessing environment.

Particular problems associated with multi-processing aspects of debugging are illustrated diagrammatically in FIG. 2. In FIG. 2, (210) is the multi-processing environment, such as CICS Transaction Server for z/OS, which is running multiple activities (221,222,223). Each of these activities is initiated and owned by a specific user (231,232,233). Activity 1 (221) and activity 3 (223) are both executing program PROGA (251). In CICS TS terms, these activities (221,222, 223) are instances of CICS transactions. Consequently, the act of debugging program PROGA (251) will affect the execution of both transactions 1 (221) and 3 (223) when a breakpoint (such as 'Halt on instruction 56') is encountered.

However, the transaction instance represented by activity 2 (222) is not being debugged, and so has no interest in the breakpoints (it does not access program PROGA (251)).

The plurality of breakpoints themselves (270) is located in a shared repository (260) which is accessible by all activities (221,222,223). For example, a breakpoint entry (271) could control the execution of program PROGA (251) by stopping execution whenever instruction 56 is encountered. Of course, if instruction 56 is not met (for example: a branch in program code avoids reaching instruction 56), execution will not halt.

In a multi-processing environment, the repository (260) has to be frequently accessed and the contents (270) read in order to garner the breakpoints (271) which determine whether or not execution is to be halted. This involves a considerable quantity of processing and has the major drawback that physically reading the repository (260) takes a long elapsed time compared to that spent actually executing the program. This performance impact is unacceptable. A more sophisticated (quicker) solution is required to satisfy response time criteria for the user.

The great majority of prior-art simply ignores this performance problem: users have to suffer greater elapsed time leading to discontent and dissatisfaction.

Some prior-art solutions involve maintaining local copies of the repository for each activity so that, at best, the performance penalty only occurs whilst the copy is being taken Both of these solutions are unacceptable. In the latter case, local copies have to be kept up to date with the accurate representation held in the repository. This technique is often called caching. This caching implies that processing has to observe when the repository (260) gets changed (entries (270) can be added, deleted or altered) and then has to send a notification to all activities (221,222,223) that the repository (260) has changed, so causing these activities to take actions to update their local copies. This has, obviously, the same performance overhead as for the initial copy, and so is unacceptable.

There is an additional performance overhead in implementing the change notification communication from the repository (260) to the activities (221,222,223). This functionality requires the existence of a Repository Manger to manage these notifications. This mechanism is often called Publish and Subscribe in prior art and the activity is known as Push technology. The additional processing, and additional functionality, associated with the provision of a Repository Manager is not required by this present invention which embodies a more sophisticated, more elegant, and more efficient approach.

As mentioned above, in considering performance issues associated with debugging, the software (and hardware) involved in actually executing debugging operations will not be considered in detail. The primary area of focus is rather with the setting and control of breakpoints, as performance issues in the control of the breakpoints are a major concern. The act of controlling breakpoints in a wide network of computers (a sysplex) has significant implications on the activity of items not being debugged.

In itself, prior art mostly ignores performance issues for items physically being debugged. These issues are largely concerned with:

setting up the debugging environment;

controlling the debugging environment;

debugging activities on executing items.

The setting up and controlling of the debugging environment are activities that have a system-level scope thus affecting all activities, not just those eligible for debugging activity.

The time spent debugging an execution instance is long compared with the actual time of program execution as the human activities involved in the debugging operation comprise most of the elapsed time spent during debugging. Prior art techniques ignore the performance and elapsed time issues involved in setting up and controlling the debugging environment.

Because prior art techniques suffer these penalties only in a localised environment, the effects are limited and perceived by humans as part of the penalty of doing debugging. In the sysplex environment, the performance penalty has a hugely wider scope and so becomes unacceptable in a large scale environment.

The present invention addresses these problems and aims to provide novel techniques for limiting these performance issues in a large scale environment and for minimising the impact of debugging or similar operations upon activities that are not undergoing debugging activity.

SUMMARY OF THE INVENTION

According to the invention, there is provided a method of controlling interruption of execution of tasks running in a multi-processing computer system to permit user intervention, said computer system including operating system means capable of running a plurality of tasks simultaneously; a repository of data identifying a preselected plurality of tasks for interruption and identifying the user defined circumstances for such interruption; and a plurality of task caches for storing subsets of the repository data for respective tasks; said method comprising the steps of: during an initialisation phase of any task, scanning said repository for data relevant to that task; storing such relevant data in the respective task cache; executing said task; determining when a defined circumstance for said task arises by reference to said respective task cache; responsive to a determination of a defined circumstance for said task arising, interrupting said task to enable user intervention, including updating of the repository to redefine circumstances for interruption; resuming execution of said task; and following resumption of execution, refreshing said respective task cache with any relevant repository updates.

The invention also provides a computer program which, when executed in a multi-processing computer system causes the system to carry out the steps of the above method.

From another aspect, the invention also provides a multi-processing computer system comprising: operating system means capable of executing a plurality of tasks simultaneously; interrupt control means for controlling interruption of execution of tasks to permit user intervention, said interrupt control means comprising: a repository of data identifying a preselected plurality of tasks for interruption and identifying the user defined circumstances for such interruption; a plurality of task caches for storing subsets of the repository data for respective tasks; means operative during an initialisation phase of any task for scanning said repository for data relevant to that task; means for storing such relevant data in the respective task cache; means operative during an execution phase of said task for determining when a defined circumstance for said task arises by reference to said respective task cache; means responsive to a determination of a defined circumstance for said task arising, for interrupting said task to enable user intervention, including updating of the repository to redefine circumstances for interruption; and means responsive to resumption of execution of said task to refresh said respective task cache with any relevant repository updates.

The invention is thus of particular value in a distributed environment, such as a sysplex.

It should be noted that, although the invention is particularly suited to debugging, it may also be applied to other operations requiring user intervention such as turning on tracing applications, performance analysis or profiling.

Whereas the prior-art focuses solely on the activity of processing the repository and deciding whether or not it has been updated, this invention takes account of the activity of the tasks reading the Repository and makes use of the fact that there are discontinuous—but discrete—points in their lifetimes at which correctness is of interest.

In particular, the present invention is based on the recognition that the human interactions involved in debugging provide discrete points in time that data in the repository has to be accurate whilst at other times (of longer duration) it does not need to be accurate so the items in the Repository are irrelevant. An example (within the environment of CICS TS) of a period that the contents of the repository are irrelevant is whilst the debugging user is investigating and manipulating the state of the halted transaction instance.

Another way of looking at the invention is to consider a data repository which contains a plurality of data items in which each data item is associated with one or more tasks and further the repository is continually updated to add new and change existing data items. A problem exists in a multi-tasking system in which multiple tasks access the repository because each task must continually search the repository for relevant data items and this serves to slow the task considerably. According to the invention when a task is started a copy of the data items relevant to the task is taken from the repository and the task accesses the copy instead of the repository, thus making a subsequent search of the repository unnecessary. However this copy may become outdated due to updates to the repository. As a result when the task reaches a wait point during which a user could update the repository, on exit from the wait point the copy is synchronised with the repository. For example, a wait point could be a debug breakpoint when the task is being run in debug mode. For example the repository could contain details of debug breakpoints or information on which the task should operate.

BRIEF DESCRIPTION OF THE DRAWINGS

A preferred embodiment will now be described, by way of example only, with reference to the drawings, in which.

DETAILED DESCRIPTION OF A PREFERRED EMBODIMENT OF THE INVENTION

The invention is described in relation to debugging within the CICS TS environment, as an example of a multi-processing system. In this debugging environment, there are distinct categories for the operations required:
- setting, deleting and amending breakpoints;
- running a transaction instance until a breakpoint is encountered;
- examining and manipulating the environment and state of the halted transaction instance;
- continuing execution of the transaction instance.

As the CICS TS environment is multi-processing, all these activities can be executing together. This means that the prior-art repository and caching techniques cannot be used to engender debugging in an efficient manner. Efficient manner means that transactions not being debugged do not unnecessarily suffer due to any other transaction being debugged. For example, a non-debugged transaction instance must not appreciably slow down whilst another transaction instance is being debugged.

This invention uses a combination of the human interaction involved with debugging and the actual debugging operations to provide an efficient manner of processing.

In particular, the human interactions involved in debugging (with examples from the implementation within the CICS TS environment) lead to behavioural expectations such as:
 those exhibited by the transaction being debugged (an instance of which is the expectation that the transaction instance being debugged should not execute abnormally slowly);
 those involved with the manipulation of breakpoints (an example of which is that newly created breakpoints do not affect currently executing transaction instances);
 those engendered by the act of state examination and manipulation (for example, the transaction instance being debugged should not continue execution until commanded so to do).

Prior art techniques do not consider these human-computer interactions to be important during the debugging operations, and so fail to properly account for them in their implementations.

The invention enables the repository to be processed in an efficient and timely fashion so providing a minimal impact on transaction instances not being debugged. Specifically, the invention enables an efficient implementation of debugging of a CICS transaction instance.

Figure 3:
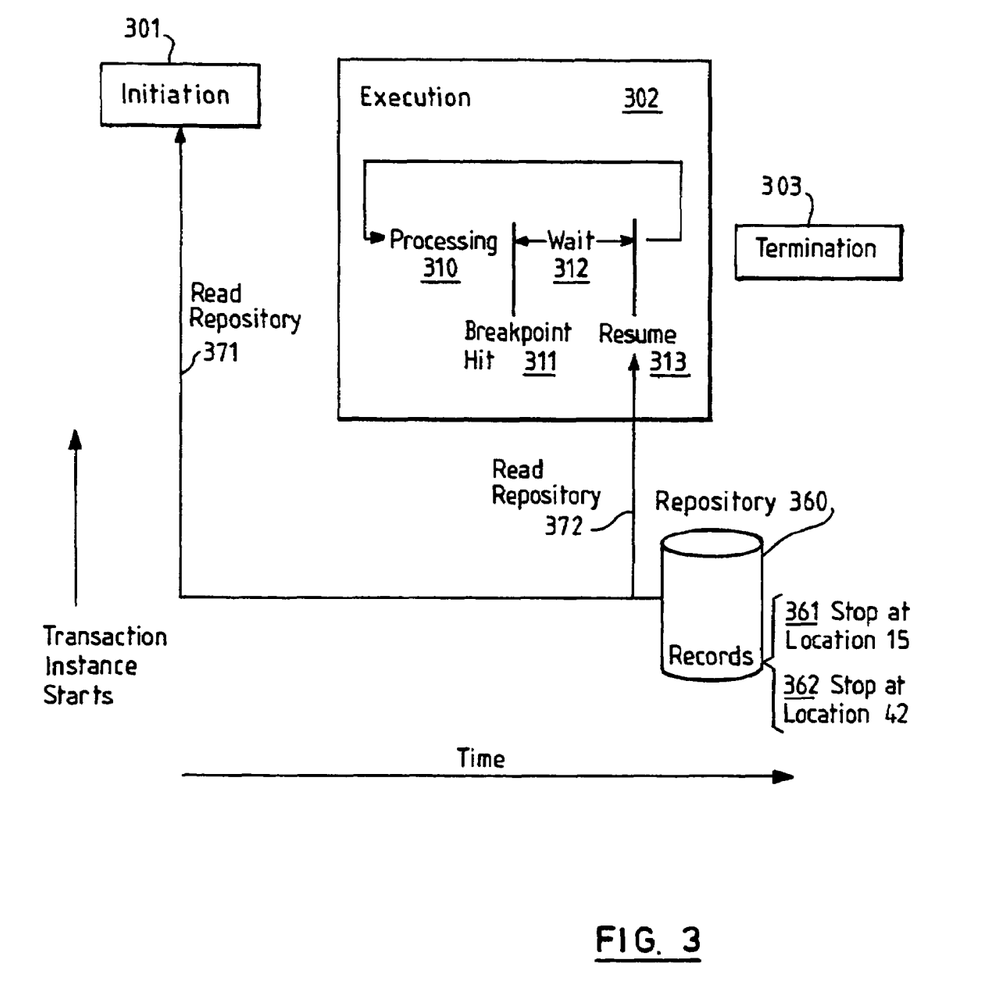
FIG. 3 is a control flow diagram of the processing of a transaction which is being debugged.

With reference to the control flow illustrated in FIG. 3, a CICS transaction instance has defined phases (300). The transaction instance starts with an initiation phase (301), followed by an execution phase (302) and a termination phase (303). The initiation (301) and termination (303) phases are hidden from the execution phase (302) and are provided by the execution environment (CICS TS itself).

When the criteria for stopping execution as defined by one of a plurality of breakpoint definitions are met (referred to as a breakpoint hit or breakpoint encountered or breakpoint met), execution of the instance is halted. These breakpoint definitions are stored in a repository 360.

In the debugging environment, the execution phase (302) is more complex. Execution continues (310) until a breakpoint is hit (311) whereupon the processing is halted (312) until the user requests execution continuation (313). Processing then continues (310) until the next breakpoint is encountered (311) or, when a breakpoint is not met, the transaction instance terminates (303). Whilst in the halted phase (312) the user (who is doing the debugging) inspects and may alter the state of the halted transaction. During this period, the plurality of breakpoints can be updated by the user, so that when execution resumes (313) the transaction will stop at this newly defined place.

The next breakpoint need not be specifically supplied. For example, a common action for a halted transaction is to execute the next instruction and then stop—but this operation does not require the physical creation of a new breakpoint as it is provided by the debugging logic. The software running the debugging operation is disjoint with the program being debugged and is outside of the scope of this present invention. It is the control of the debugger with which this present invention is concerned: in particular, the way the breakpoints are set and manipulated and the execution environment amended for the program being debugged.

Thus, if a breakpoint (361) causes a halt (311), another breakpoint (362) can be added so when execution resumes (313) the transaction instance will now halt (311) when the new breakpoint (362) is met.

The present invention provides a technique to ensure that this debugging processing does not require a complete access of the repository to gather breakpoint information and so does not impact on the performance of transactions not being debugged.

This technique is based on these considerations:
 1. A transaction instance is either eligible for debugging or it is not: this is determined at its initiation time.
 2. The contents of the Repository can change randomly during the initiation phase. However, contents are only relevant at the instant they are read (so amendments after it is read during the initiation phase (301) are not applicable).
 3. Amendments to the Repository made whilst a transaction instance is executing (302) are not relevant. An executing transaction instance cannot suddenly exhibit debugging activity after it was started: all breakpoints relevant for the executing transaction instance have to be created and active before the instance is actually executing.
 4. Updating the contents of the repository involve user interaction as well as physical activity on the data store and so take considerably longer in elapsed time than does program execution.
 5. If a transaction has halted and is undergoing debugging activity, the only time when the contents of the Repository become relevant is when execution is resumed (313), as this is when the plurality of breakpoints is determined afresh.
 6. Therefore, the only times where the Repository contents are of interest are:

as part of Initiation (371)

at Breakpoint resumption (372).

Figure 4:
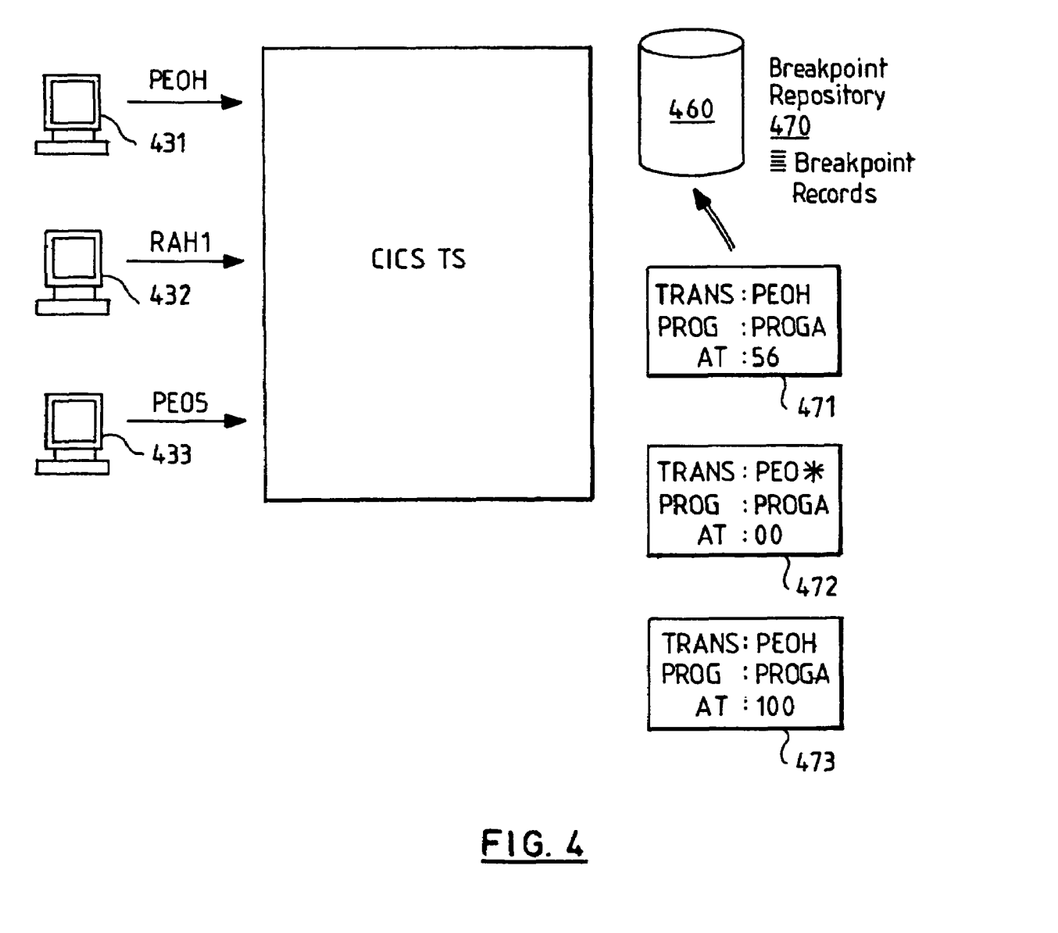
FIG. 4 illustrates an example of the selection of transactions for debugging under different breakpoint conditions.

Turning to FIG. 4 to illustrate this in combination with FIG. 3, the Repository (460) can hold a number of breakpoint records 470 but, initially, is assumed to contain only a single breakpoint entry (471) which operates on an instance of transaction PEOH.

An instance of transaction RAH1 (432) is initiated (301). At its initiation time the repository (460) is read (371) and no match on that transaction name (RAH1) is found as 471 refers to another transaction name. Hence, debugging activity is not enabled for this transaction. Consequently, this transaction instance is never interested in the contents of the repository (460) and so never accesses it again. This technique imposes, therefore, minimal impact of the execution of RAH1 as required by this invention.

In contrast, when an instance of transaction PEOH (431) is run, the scan (371) of the repository (460) detects a match with transaction name (471): so this transaction instance is enabled for debugging and all potentially relevant breakpoints are extracted from the repository (only 471 at the moment). Execution then proceeds until instruction 56 is encountered in program PROGA (breakpoint hit 311), whereby the debugging operation causes execution to halt (312). As a consequence of the state examination, the user creates another breakpoint (473) which will cause execution to stop at instruction 100 of program PROGA. Normal execution then resumes (313). This act of resumption causes the repository to be re-read and the new breakpoint (473) determined. Whilst this is occurring, another user executes an instance of transaction PEO5 (433) but no match is found, so this transaction instance is not stopped and debugged. When PEOH again halts due to the new breakpoint (473) being hit, the user adds a new breakpoint (472) which is applicable to all transaction instances whose name starts with PEO (a generic definition). Whilst PEOH is still halted, an instance of transaction PEO5 is again executed. This time, however, the repository scan (371) finds a match (on 472 which has a generic name) and so PEO5 is eligible for debugging activity. The relevant breakpoint (472) causes execution to stop as soon as program PROGA is encountered.

Returning to FIG. 3, the scan (371) of the Repository (360) during transaction instance initialisation (301) in this present invention will return one of three outcomes:
  the transaction instance is definitely to undergo debugging;
  the transaction instance will not be debugged;
  the transaction instance might need to be debugged.

For example (in the preferred implementation of the CICS TS environment):
  any breakpoint definition which quotes the transaction name of the current transaction instance will engender the Definite indication;
  the Will Not indication is engendered if all the breakpoints apply to an Userid which is not that of the current user of the transaction instance;
  Any breakpoint that just names a given program (such as PROGB) will engender the MIGHT indication as it is not known whether or not the transaction instance will execute the given program.

There is no significant difference between the DEFINITE and MIGHT indications: both of these require that the transaction instance undergo debugging activity. Whether or not the transaction instance will subsequently hit a breakpoint is irrelevant at this time—debugging has to be enabled for the transaction instance for any potential breakpoint to be hit.

The multi-processing environment (CICS TS in the preferred implementation) associates certain metadata with a transaction instance. CICS TS uses the name of the executing instance of CICS TS, the transaction name, owning terminal name, start date/time, and Userid amongst others as information associated with a transaction instance. The initial scan (371) of the repository (360) uses this information to decide whether or not the transaction instance is to be debugged. Consequently, either the repository scan definitely determines that debugging is not to proceed on the instance or it enables debugging for that instance.

This invention does not require that the decision to enable a transaction instance for debugging requires a breakpoint to be taken. (In software engineering terms, there is only a relation between the two parts, not a map.)

Figure 5:
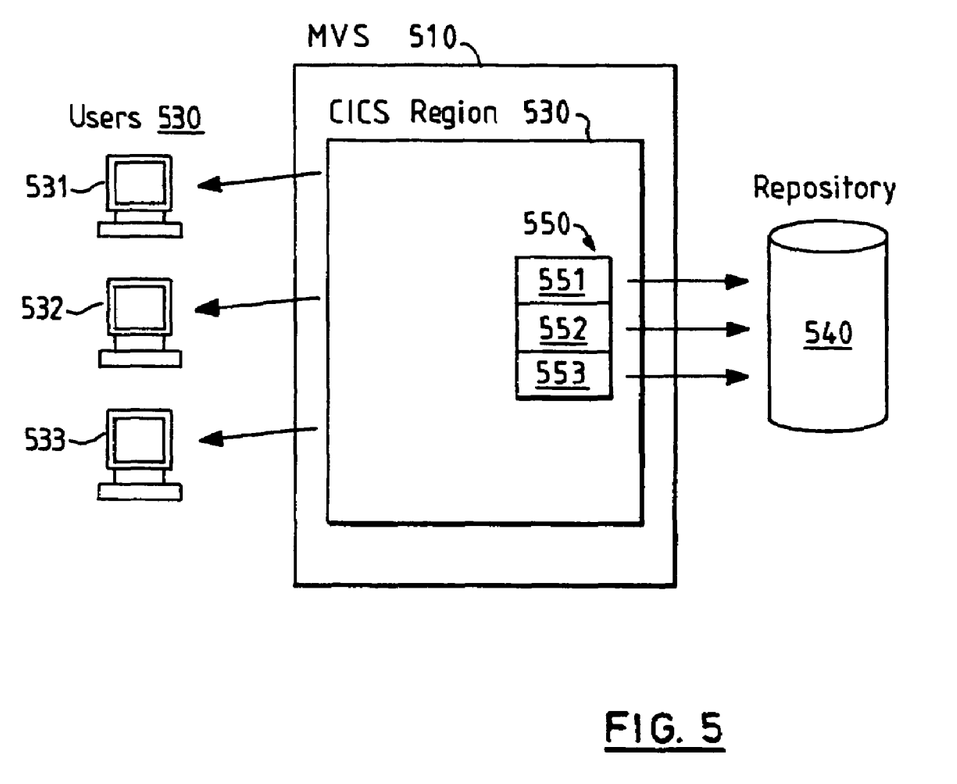
FIG. 5 is a simplified diagram of a multi-processing computer system according to an embodiment of the invention illustrating the caching of repository data.

One implementation of this invention in CICS TS is described in FIG. 5. A single CICS TS region (520) is executing in a mainframe computer running the IBM z/OS operating system (510). Any of the users (530), represented by their input terminals (531,532,533), has the potential to undergo debugging of their associated transactions according to the contents of the repository (540). The contents of the repository (540) are scanned and those relevant to the transaction instance placed in memory (550). This memory copy (550) is accessed by the breakpoint manager 112 (FIG. 1) which is part of the debugging tool 110. Although this area (550) is physically one chunk of memory, it is logically partitioned (551,552,553) according to the transaction instance. So the transaction instance associated with user (531) has a cached extract (551) of the Repository that is relevant to itself. If the scan (371) that builds these items (550) in memory does not detect that the transaction instance has the potential to be debugged (by accessing the metadata held in the Breakpoints in the Repository), the associated area is empty. An empty area (55n) means that debugging will not be enabled for the associated transaction instance.

This initial scan of the repository (that which is done as part of the initiation phase (301) of the transaction instance (371)) proceeds in two logical stages:
  the use of the metadata to determine eligibility (a quick operation as the Repository is structured to give rapid access for this operation);
  the extraction of all relevant breakpoints (a longer operation).

A key aspect of this invention is that the repository is structured to provide rapid detection of eligibility (so that undue performance overheads are not applied to transaction instances not involved with debugging activities). These activities are described in FIG. 7 for a transaction instance in its initiation phase (710).

Figure 7:
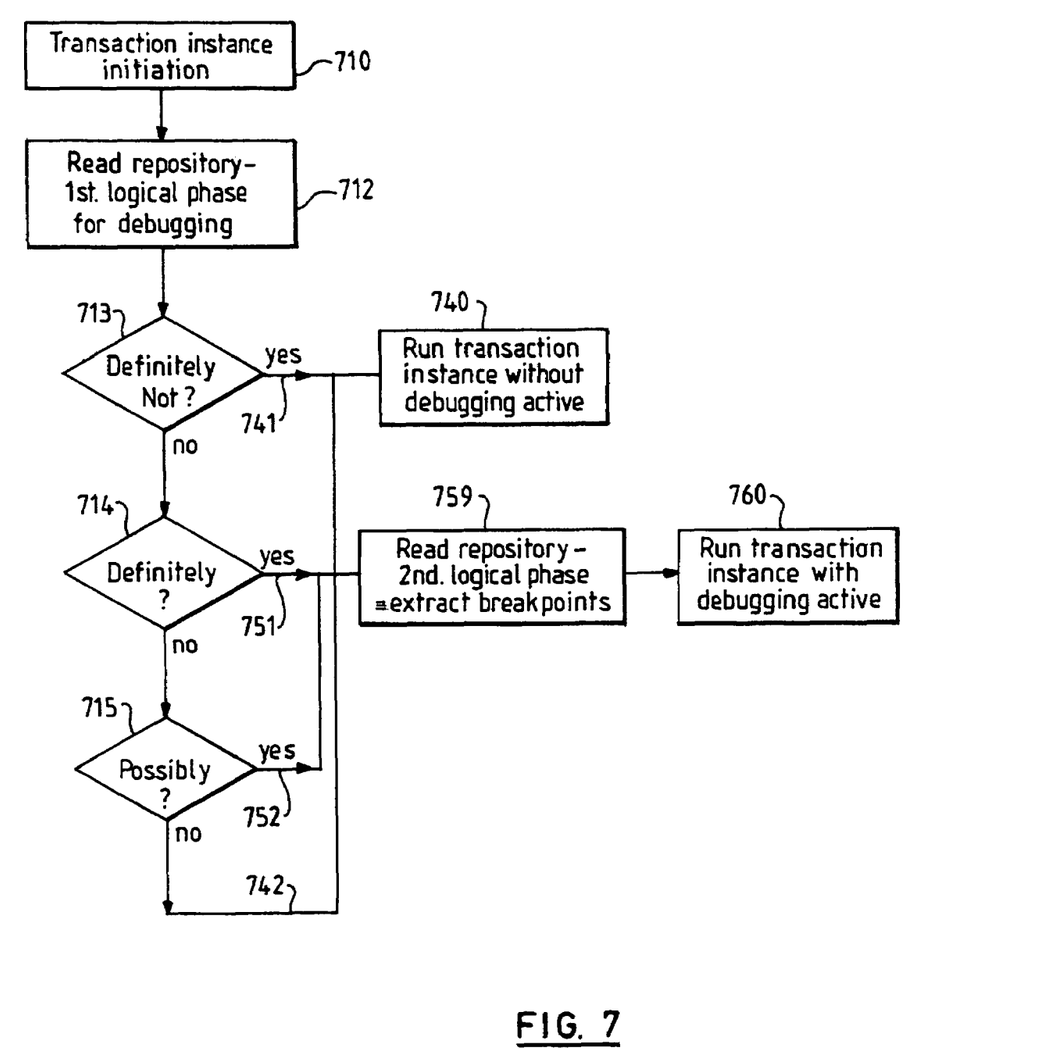
FIG. 7 is a flow diagram illustrating the basic steps of a method of controlling interruption of execution of tasks according to an embodiment of the invention.

If the first logical stage (712) of the repository scan (713, 715) does not find any indications that the transaction instance must or could be debugged (741,742), then the second stage of the scan will not proceed, the associated memory (55n) will be empty and the transaction instance will not be debugged (740).

However, if the first stage of the repository scan (712) finds indications that the transaction instance needs to be debugged (714, 751) or might be eligible for debugging (715,752), the second stage of the scan (759) will extract all relevant (or potentially relevant) breakpoints and copy them into the associated memory area (55n) for the transaction instance and that transaction instance will undergo debugging (760) activity.

The structuring of the repository to support a rapid first logical stage means that a minimal overhead is imposed upon transaction instances that are not to be debugged, so meeting the performance criteria of this invention.

If the memory extract (55n) of the repository (540) is not empty (it contains breakpoint information) the owning transaction instance will be eligible for debugging processing and will proceed according to FIG. 3. The repository can be updated randomly during execution of the debugging-enabled transaction instance, so when a breakpoint is hit (311), the act of resumption (313) will read the repository (540) for accurate debugging information and repopulate the relevant area (55n). The relevant areas (550) containing information from the repository about breakpoints (470) are passed to the debugging logic and thereby used to control execution of programs being debugged.

Figure 6:
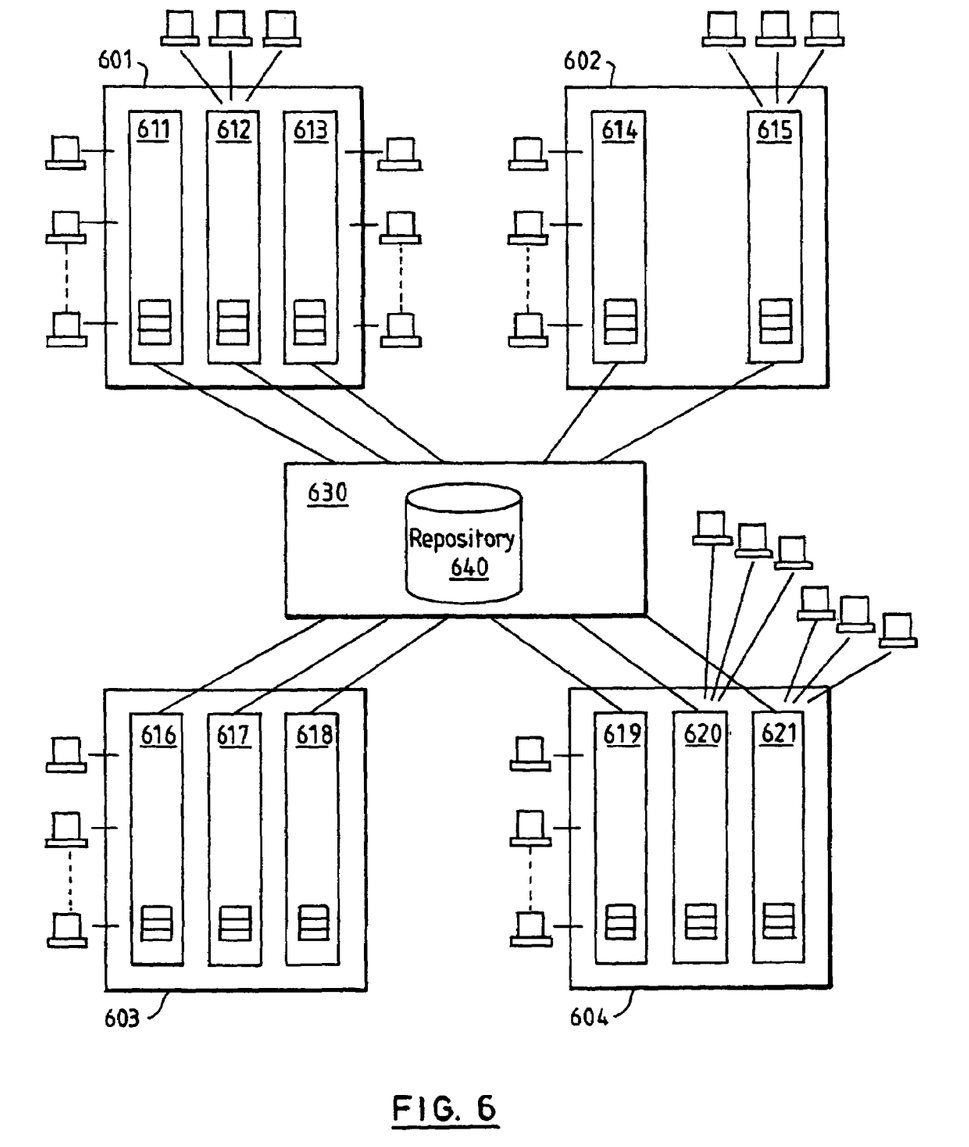
FIG. 6 is a simplified diagram of a sysplex multi-processing computer system according to the invention, showing the caching in different components of the sysplex of repository data located in a coupling facility.

FIG. 6 shows a more complex mainframe z/OS environment having multiple CICS TS regions (611,612,613) executing within a mainframe running z/OS (601) Further CICS TS regions (614-621_execute within further mainframes running z/OS (602,603,604) as shown. All these z/OS and CICS TS instances communicate with each other via a coupling facility (630). The contents of the coupling facility are visible to all z/OS and CICS TS regions linked to it. This type of sysplex arrangement is commonly referred to in CICS TS terms as a CICSPlex).

When executing a CICS transaction within the CICSPlex environment of FIG. 6 all problems involved with executing within a single CICS instance (520) are considerably magnified. This is due to the combinational properties of many distinct environments operating in parallel (a volume related issue) together with the requirement that an activity shared across these environments has the same operational characteristics as if it were operating in a non-linked environment.

This means that a user of a CICS transaction has no idea of where and how that transaction instance is executing: the same results are seen by the user wherever and however the activity is physically implemented and executed. Clearly, such a highly complex and high volume environment requires an efficient method of enabling debugging: this is not provided by the prior art.

This is especially difficult to accomplish when (for example) a CICS transaction is being debugged and this transaction instance executes within all components of the CICSPlex. Debugging activity has to occur throughout the mainframe z/OS operating systems (601,602,603,604) making up the CICSPlex in all instances of CICS TS regions (611, 612 . . . 620, 621) without affecting other transaction instances that are not involved in debugging activity.

As there are more transactions running in the CICSPlex which do not require to be debugged than those undergoing debugging operations, it is vitally important that the act of debugging a few transaction instances does not materially affect the much greater number of non-debugged transaction instances. This problem is known as Sympathy Sickness. In contrast to some prior-art solutions, this present invention does not exhibit sympathy sickness effects. In software engineering terms, this present invention exhibits an Order (1) behaviour pattern and so scales within the sysplex without untoward impact for transaction instances that are not being debugged.

To be more specific, in the preferred environment for this invention, a CICS transaction can be physically executing in more than one CICS TS region in the CICSPlex. Consequently, components of a CICS transaction can be executing in CICS TS regions (611,612,620,607 and 615) all using the coupling facility (630) for communication in the sysplex. Debugging activity is required throughout all components of the CICS transaction instance.

Consequently, debugging has to be active in all CICS TS regions in the CICSPlex used by the transaction (611,612, 620,607 and 615) and the breakpoint information has to be accessible throughout the CICSPlex. Thus, repository (640) controlling the debugging has to be accessible throughout the linked environment. Therefore, the repository (640) resides within the Coupling Facility (630) so it can be generally accessed across the Sysplex.

In this complex sysplex environment, the aforementioned prior-art techniques are difficult to implement. A typical prior art implementation (such Publish & Subscribe or Push functionality) requires considerable processing overheads involving highly complex integrity and accuracy algorithms. An additional drawback of these techniques involves the latency (elapsed time of propagation) of processing so that timings cannot be guaranteed, so causing unnecessary delay until items can be guaranteed accurate and consistent throughout the sysplex. This latency imposes a delay on both items to be debugged and additionally those not to be debugged. These considerations do not arise with the present invention.

The overhead in maintaining a debugging environment throughout the sysplex environment is avoided using the techniques detailed in this present invention. Unlike prior art techniques, the impact upon activities not undergoing debugging activity is avoided, thus providing the required level of performance and functionality required by users.

To recapitulate the operation of this invention in a large system, e.g., a sysplex with many tasks running, at any one time, a subset (possibly all) of the whole repository is of interest to a task. This subset consists of all those breakpoints which satisfy the characteristics of the running task. Transaction start and every subsequent program and subroutine start for the task will require a scan of the repository to check if the task should halt for debug. It is assumed that a task that doesn't find any breakpoints completes relatively quickly (as breakpoints cause a halt). Some sort of caching of the repository is required due to the potential for the number of scans per task to be high, such as in a transaction with many programs.

If the task finds no reason to halt, it is enough for the cache to be populated at task start (with the subset of interest) and used for all subsequent scans. This is because, as long as the cache is populated at task start, a human user updating the repository after task start with a new breakpoint would not have the expectation that the new breakpoint should cause a halt as the task would have completed so quickly. As the cache is populated with only the relevant subset of the repository, subsequent scans are optimised ensuring that the task completes quickly.

When a scan for a task finds a relevant breakpoint, the task halts in debug mode. The halt means that the task is no longer reading its cache so cache content is irrelevant. A human user setting a new breakpoint on the repository before resuming the halted task would now have the expectation that the new breakpoint would be honoured after the task starts. Therefore the cache refresh is performed by any task immediately when it resumes after a breakpoint halt.

Thus, the cache is refreshed based on the knowledge of the activity of the readers of the cache. A complex mechanism to propagate repository refreshes to local caches as they occur is avoided. This is particularly beneficial for a repository that is shared across a sysplex where the coordination of the cache refreshes would be difficult to manage. The solution is particularly beneficial where there are many tasks, each with many programs and subroutines, but with a very low number of breakpoints since, because debug is "on" for a whole region, even tasks that never have breakpoints still have to do the scanning.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

What is claimed is:

1. For use in a computer system capable of executing multiple transactions concurrently and including a repository of information relating to such transactions, a computer-implemented method of controlling the execution of individual instances of said transactions, said method comprising:

retrieving stored information from the repository identifying a transaction instance to be executed either as non-interruptible or as interruptible;

in response to an identification of the transaction instance as non-interruptible, initiating execution of said transaction instance;

in response to an identification of a task instance as interruptible, retrieving stored information from the repository defining breakpoint conditions under which execution of said transaction instance is to be interrupted, storing said retrieved information in a cache associated to said transaction instance, initiating execution of said transaction instance, monitoring the execution of said transaction instance for the occurrence of a defined breakpoint condition defined in the associated cache, upon occurrence of a defined breakpoint condition, interrupting execution of said transaction instance to permit user-controlled operations to be performed, upon conclusion of the user-controlled operations, updating the associated cache and the repository in accordance with the user-controlled operations, and resuming execution of said transaction instance.

2. A method according to claim 1 wherein said user-controlled operations further comprises debugging operations.

3. A method according to claim 2 wherein retrieving stored information identifying a transaction instance to be executed either as non-interruptible transaction instance or as interruptible further comprises:

reading a transaction instance identifier; and using said read transaction instance identifier to search the repository for said stored information.

4. A method according to claim 3 wherein updating the associated cache and the repository in accordance with the user-controlled operations further comprises storing information defining new breakpoint conditions under which execution of said transaction instance may be interrupted.

5. A method according to claim 4 wherein the transaction instance identifier used in identifying a transaction instance as non-interruptible or interruptible further comprises a user identifier.

6. A computer program product for controlling the execution of individual instances of transactions being executed in a computer system capable of executing multiple transactions concurrently and including a repository of information relating to such transactions, said computer program product comprising a computer readable record medium having computer program instructions recorded thereon, said computer program instructions further comprising:

computer program instructions configured to retrieve stored information identifying a transaction instance to be executed either as non-interruptible or as an interruptible;

computer program instructions configured to, in response to an identification of the transaction instance as non-interruptible, initiate execution of said transaction instance;

computer program instructions configured to, in response to an identification of a task instance as an interruptible task instance, retrieve stored information defining breakpoint conditions under which execution of said transaction instance is to be interrupted, store said retrieved information in a cache associated to said transaction instance, initiate execution of said transaction instance, monitor the execution of said transaction instance for the occurrence of a defined breakpoint condition defined in the associated cache, upon occurrence of a defined breakpoint condition, interrupt execution of said transaction instance to permit user-controlled operations to be performed, and upon conclusion of the user-controlled operations, update the associated cache and the repository in accordance with the user-controlled operations, and resume execution of said transaction instance.

7. A computer program product according to claim 6 wherein said user-controlled operations further comprises debugging operations.

8. A computer program product according to claim 7 wherein said computer program instructions configured to retrieve stored information identifying a transaction instance to be executed either as non-interruptible or as interruptible further comprises:

computer program instructions configured to read a transaction instance identifier; and computer program instructions configured to use said read transaction instance identifier to search a system memory for said stored information.

9. A computer program product according to claim 8 wherein said computer program instructions configured to update the associated cache in accordance with the user-controlled operations further comprises computer program instructions configured to store information defining new breakpoint conditions under which execution of said transaction instance may be interrupted.

10. A computer program product according to claim 9 wherein the transaction instance identifier used in identifying a transaction instance as non-interruptible or interruptible further comprises a user identifier.

11. A multi-processing computer system comprising:

an operating system component for executing a plurality of transaction instances concurrently;

a data repository for storing information about executable transactions, said information including whether or not a transaction instance is eligible for interruption and, if so, information defining breakpoint conditions under which said transaction instance should be interrupted during execution;

a plurality of task caches, each for storing information relating a particular executable transaction instance;

a repository reading component for retrieving stored information from the repository, said retrieved stored information including information identifying the particular transaction instance either as non-interruptible or interruptible, a transaction execution controller for in response to an identification of the transaction instance as a non-interruptible transaction instance, initiating execution of said transaction instance; and in response to an identification of the transaction instance as an interruptible task instance, retrieving stored information from the repository defining breakpoint conditions under which execution of said transaction instance is to be interrupted, storing said retrieved information in the cache associated to said transaction instance, initiating execution of said transaction instance, monitoring the execution of said transaction instance for the occurrence of a defined breakpoint condition defined in the associated cache, upon occurrence of a defined breakpoint condition, interrupting execution of said transaction instance to permit user-controlled operations to be performed, and upon conclusion of the user-controlled operations, updating the associated cache and the repository in accordance with the user-controlled operations, and resuming execution of said transaction instance.

* * * * *